United States Patent
Graff

[15] 3,687,494
[45] Aug. 29, 1972

[54] COPPER COMPRESSION RING
[72] Inventor: Elmer Graff, Galt, Ontario, Canada
[73] Assignee: Canadian Brass Limited, Galt, Ontario, Canada
[22] Filed: Sept. 14, 1970
[21] Appl. No.: 71,849

[52] U.S. Cl..........285/341, 285/382.7, 285/DIG. 19, 285/DIG. 18
[51] Int. Cl..............................................F16l 17/02
[58] Field of Search...285/382.7, 341, 342, 343, 382, 285/DIG. 18, DIG. 19; 277/112, 228, 235 R, 236

[56] References Cited
UNITED STATES PATENTS
3,025,084   3/1962   Franck................285/382.7 X
2,913,264   11/1959  Suendermann et al....285/342

FOREIGN PATENTS OR APPLICATIONS
647,999   12/1950   England....................285/341

Primary Examiner—David J. Williamowsky
Assistant Examiner—Wayne L. Shedd
Attorney—Douglas S. Johnson

[57] ABSTRACT

A tube coupling consists of an externally threaded body and cooperating nut bearing on an interposed ring which contains a rubber gasket to provide a seal on compression of the ring by the interaction of the body and the nut.

4 Claims, 2 Drawing Figures

PATENTED AUG 29 1972　　　　　　　　　　　　　　3,687,494

INVENTOR.
ELMER GRAFF

BY Douglas A. Johnson

Attorney

COPPER COMPRESSION RING

FIELD OF THE INVENTION

This invention relates to a coupling for tubes, a coupling being of the type comprising a threaded body member which surrounds the tube, and a cooperating nut, tightening of which creates pressure on an interposed deformable ring, the pressure resulting in clamping engagement of the ring on the tube.

PRIOR ART

Various types of coacting couplings have been proposed and one well-known arrangement involves a double wedging action by a threaded member and cooperating nut on the deformable ring but dependent on flaring the end of one of the tubes and using a sleeve which engages with this flared end.

A more recent proposal is the use of an arcuate compression element, the opposed ends of which bite into the external surface of the tube as a result of compression supplied by the threaded body member and cooperating nut; however, to ensure this double bite, the body member and nut both have to be specially shaped because one has to have an annular end wall which abutingly engages an opposed annular shoulder on the other.

Another arrangement involves the use of a compressable sleeve, preferably frangibly attached to the body member of the coupling, the sleeve containing a ring of plastic material which, on compression bears against the tube; however, this sleeve has to have a special configuration and the cooperating nut member has to be not only flared but provided with a cylindrically bearing surface which contacts the sleeve.

While copper tubing is the conventional material to supply water for mains, a development in recent years has been the use of plastic pipe.

SUMMARY OF THE INVENTION

Accordingly, it is an object of this invention to provide a coacting coupling which is equally suitable for a copper or plastic tube, is relatively cheap to construct and simple to apply with a resulting consistently good seal.

The invention consists in providing a coacting coupling which includes an externally threaded body member and cooperating nut bearing on an interposed ring having, with respect to the underlying tube, an inwardly disposed open face, said ring containing a gasket of resilient material which provides a seal with the tube on compression of the ring due to interaction of the threaded body member and cooperating nut. The ring has a flange or tongue which cooperates with the outwardly flared end of the threaded body member.

BRIEF DESCRIPTION OF THE DRAWINGS

The invention will now be described in relation to the accompanying drawings in which.

DESCRIPTION OF THE PREFERRED EMBODIMENT

Figure 1:
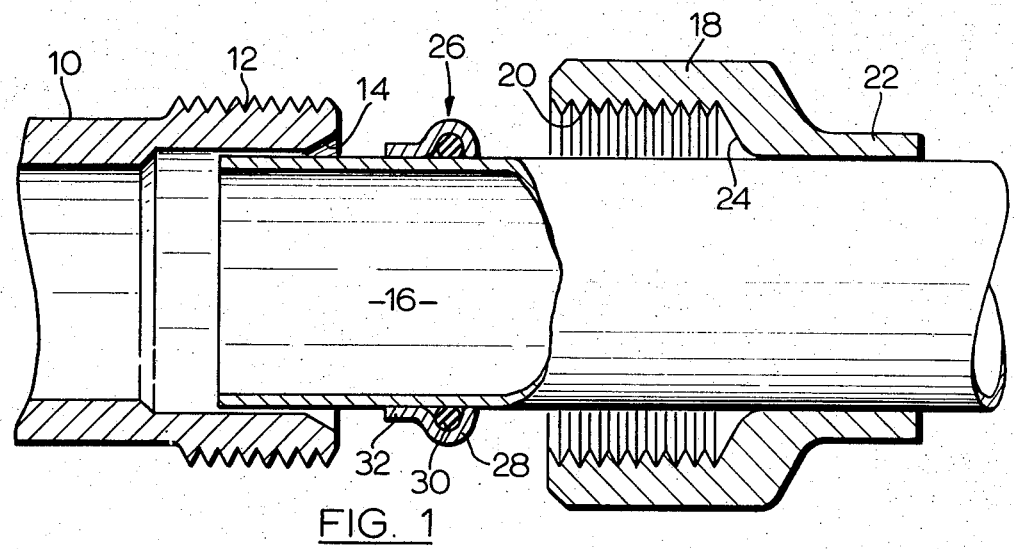
FIG. 1 is a sectional view of the elements of the coupling shown as arranged before attachment to the tube.
Figure 2:
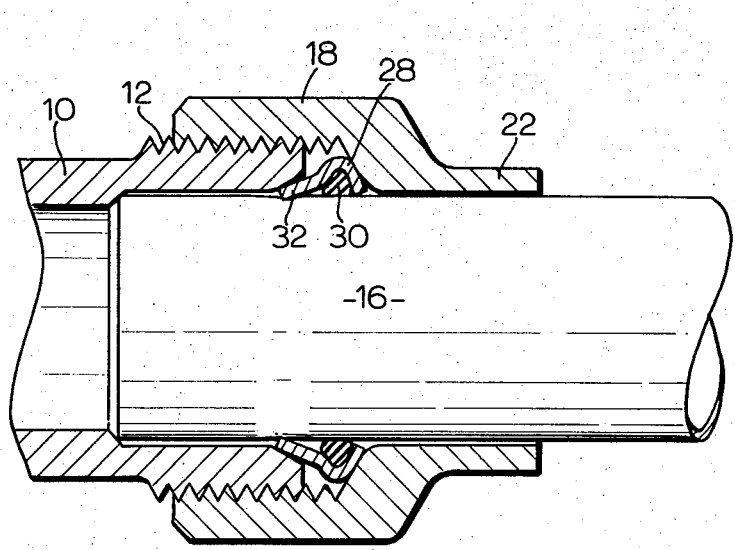
FIG. 2 is a sectional view of the coupling embodying the invention secured to the tube.

Referring now to the drawings, a body 10, having external threads 12 and a flared mouth 14, embraces the end of the tube 16 which is to be coupled. The body 10 has a bore coextensive with the bore of the tube 16; the flared mouth 14 is given a conical form, the pitch thereof being approximately 20°.

Also shown is a conventional nut 18, having internal threads 20, and an integral tail 22. The junction of the internally threaded nut 18 and the integral tail 22 provides a tapered camming shoulder 24. The threaded nut 18 is adapted to complementarily engage the threaded body 10 and the bore of the tail 22 is coextensive with the tube 16.

Surrounding the tube 16 is a member generally denoted by the numeral 26 which is disposed between the threaded body 10 and the nut 18, the member 26 includes a sleeve or annulus 28, the opposed concave face of which is inwardly disposed with respect to the underlying tube 16. A ring 30 of resilient material, such as rubber, is positioned in the annulus 28, the width of the latter being such that the ring 30 fits snugly therein so that the member 26 can be handled without the ring 30 falling out.

The annulus 28 has an integral flange or tongue 32 which encompasses the tube 16. The internal diameter of the flange 32 and the end of the annulus 28 removed from the flange 32 is slightly greater than the external diameter of the tube 16 so that the member 26 can be slipped easily over the tube 16. The member 26 is made of a deformable metal such as copper.

FIG. 1 shows the assembly of the parts of the coupling prior to engagement and it will be observed that the flange 32 of the member 26 is directed towards the flared mouth 14 of the threaded body member 10.

To assemble the coupling, the nut 18 is advanced towards the threaded body 10 with the threads 20 cooperating with the threads 12. On continuing rotation of the nut 18 pressure is brought to bear by the shoulder 24 against the end of the annulus 28 removed from the flange 32 with the result that the latter comes into frictional contact with the flared mouth 14 of the threaded body 10. The further interaction is such that the flange 32 begins to deform and starts to bite into the wall of the underlying tube 16; and the shoulder 24 bearing against the annulus 28 causes the rubber ring 30 to be radially distorted with the result that it elongates in a vertical direction with respect to the longitudinal axis of the tube 16 and forms a seal therewith.

I claim:

1. A tube coupling comprising an externally threaded body member enclosing a tube, said body member having a flared mouth, an internally threaded nut, having an integral tail, threads on said nut cooperating with the external threads on said body member, said tail and said nut forming an internally camming shoulder, and a ring member of deformable material interposed between said body member and said nut; said ring member having an annulus containing a ring of resilient material, said flange being maintained in contact with said annulus and a flange formed integrally therewith and embracing said tube in substantially close parallel relationship thereto, said flange embracing said tube so as to be directed axially along said tube toward said flared mouth of said body member so that, on threaded engagement of said nut and said body member, said shoulder of said nut bears against said annulus and said flared mouth bears against said flange so as to deform said flange into intimate contact with said tube and to distort said resilient ring into a sealing relationship with said tube.

2. A tube coupling according to claim 1, wherein the flared mouth has a conical pitch of approximately 20°.

3. A tube coupling according to claim 1, wherein said ring member interposed between said body member and said nut is made of copper.

4. A tube coupling according to claim 1, wherein said ring of resilient material is made of rubber.

* * * * *